US012583244B2

(12) United States Patent
Yamasaki et al.

(10) Patent No.: US 12,583,244 B2
(45) Date of Patent: Mar. 24, 2026

(54) INKJET RECORDING APPARATUS

(71) Applicant: KYOCERA Document Solutions Inc., Osaka (JP)

(72) Inventors: Shunsuke Yamasaki, Osaka (JP); Masahiko Mizuno, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 146 days.

(21) Appl. No.: 18/678,023

(22) Filed: May 30, 2024

(65) Prior Publication Data

US 2024/0408902 A1 Dec. 12, 2024

(30) Foreign Application Priority Data

Jun. 6, 2023 (JP) ................................. 2023-093135

(51) Int. Cl.

| | |
|---|---|
| ***B41J 25/308*** | (2006.01) |
| ***B41J 11/00*** | (2006.01) |
| ***B41J 25/304*** | (2006.01) |
| *B41J 2/21* | (2006.01) |

(52) U.S. Cl.

CPC ......... *B41J 25/308* (2013.01); *B41J 25/3088* (2013.01); *B41J 2/2146* (2013.01); *B41J 11/0035* (2013.01); *B41J 25/304* (2013.01)

(58) Field of Classification Search

CPC .. B41J 25/3088; B41J 25/308; B41J 25/3086; B41J 2/2146; B41J 11/0035; B41J 25/304; B41J 2025/008

See application file for complete search history.

(56) References Cited

U.S. PATENT DOCUMENTS

2014/0063091 A1* 3/2014 Ehara ..................... B41J 25/304 347/8

FOREIGN PATENT DOCUMENTS

| | | |
|---|---|---|
| JP | 2003-072055 A | 3/2003 |
| JP | 2007-190737 A | 8/2007 |

* cited by examiner

*Primary Examiner* — Geoffrey S Mruk
(74) *Attorney, Agent, or Firm* — Studebaker Brackett PLLC

(57) ABSTRACT

An inkjet recording apparatus includes a head unit and a gap adjustment device. The head unit includes one or more inkjet heads. The gap adjustment device adjusts a gap of the head unit with respect to a conveyance path. The gap adjustment device includes a shaft, a rotating body, a stepped part, a gap adjustment member, a spherical body. The rotating member has an intersection surface intersecting the shaft and is rotatable around the shaft. The stepped part is provided on the intersection surface and its height is changed in a stepped pattern in a circumferential direction. The gap adjustment member has a rear side surface facing the intersection surface and a front side surface being in contact with the head unit, and is movable in a direction of the shaft. The spherical body is held between the rear side surface and the intersection surface.

9 Claims, 10 Drawing Sheets

I – I

INKJET RECORDING APPARATUS

INCORPORATION BY REFERENCE

This application is based on and claims the benefit of priority from Japanese patent application No. 2023-093135 filed on Jun. 6, 2023 which is incorporated by reference in its entirety.

BACKGROUND

The present invention relates to an inkjet recording apparatus.

To obtain good image quality in an inkjet recording apparatus, it is necessary to optimize a distance between a sheet to be conveyed and an inkjet head. Accordingly, a technique for adjustment a height of the inkjet head according to a thickness of the sheet is studied. For example, there is a configuration in which the inkjet head is provided with a member in contact with the upper surface of the sheet, and the inkjet head is lifted by the sheet to be conveyed together with the member.

However, in the above configuration, the contact of the member applies a load on the sheet conveyance. Therefore, the conveyance speed may change, and there is a risk of a print position shift or a color shift. As a configuration in which the member is not in contact with the sheet, a configuration in which the inkjet head is mounted on a stepped member provided below the inkjet head, the stepped member is slid linearly to adjust the height of the inkjet head. However, in this case, since a space is required for the stroke of the stepped member, the size of the apparatus increases. In addition, an impact occurs when the inkjet head gets over the step of the stepped member, and durability is reduced. In order to avoid the impact, the inkjet head may be temporarily retracted, but the time required for the retraction and return of the inkjet head delays the start of printing. Further, since the stepped member reciprocates, an impact due to backlash of a gear driving the stepped member is generated. It is possible to take measures to suppress the impact caused by the backlash, but the configuration becomes complicated.

SUMMARY

An inkjet recording apparatus according to the present disclosure includes a head unit and a gap adjustment device. The head unit includes one or more inkjet heads. The gap adjustment device adjusts a gap of the head unit with respect to a conveyance path along which a sheet is conveyed. The gap adjustment device includes a shaft, a rotating body, a stepped part, a gap adjustment member, a spherical body or a protrusion. The rotating member has an intersection surface intersecting the shaft and is rotatable around the shaft. The stepped part is provided on the intersection surface and its height is changed in a stepped pattern in a circumferential direction. The gap adjustment member has a rear side surface facing the intersection surface and a front side surface being in contact with the head unit, and is movable in a direction of the shaft. The spherical body is held between the rear side surface and the intersection surface. The protrusion protrudes from the rear side surface and is in contact with the intersection surface.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the drawings, an inkjet recording apparatus according to one embodiment of the present invention will be described.

Figure 1:
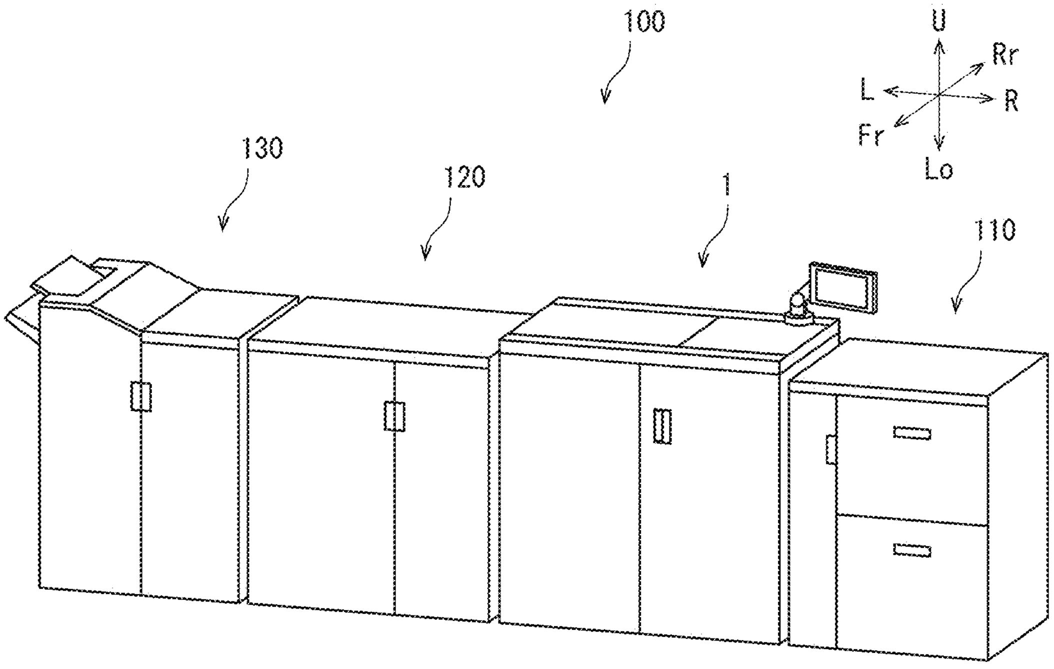
FIG. 1 is a perspective view showing an appearance of an image forming system according to one embodiment of the present disclosure.
Figure 2:
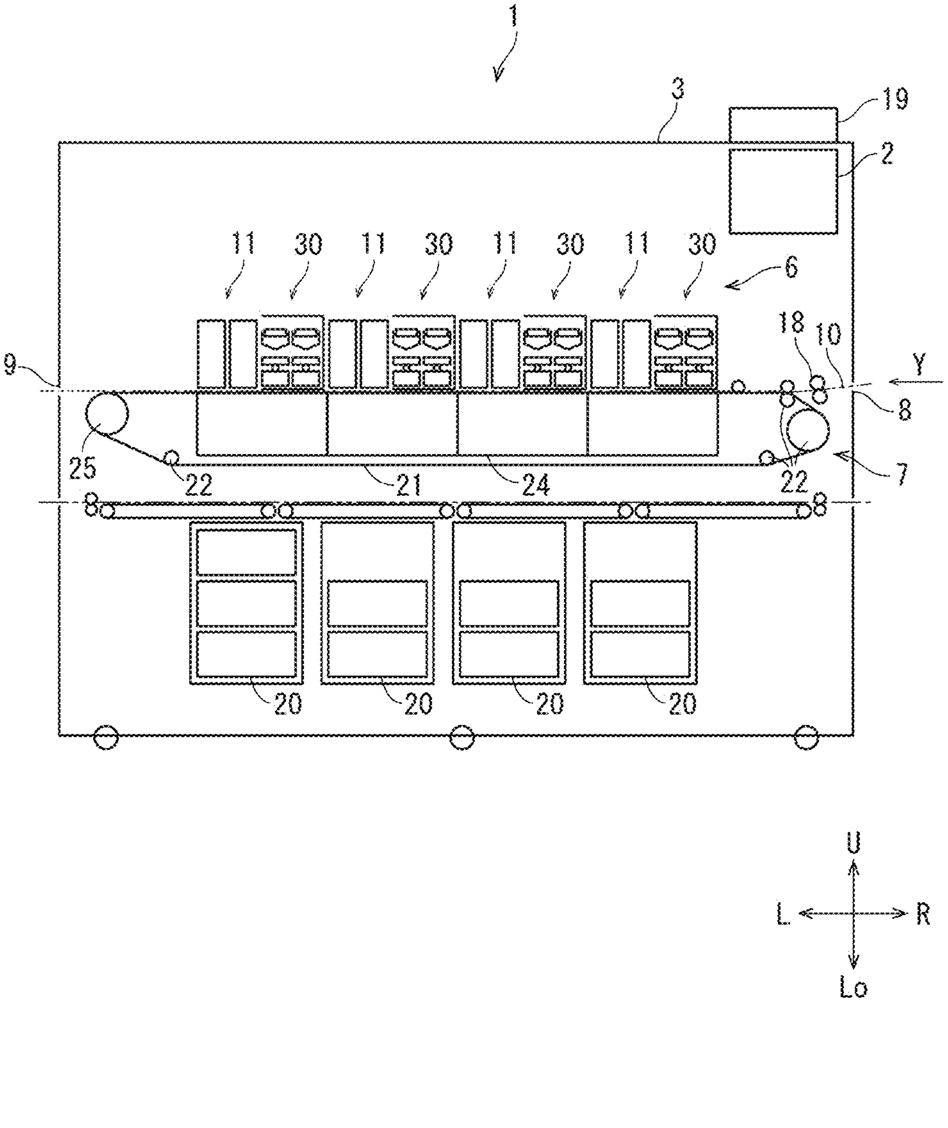
FIG. 2 is a front view schematically showing an inner configuration of an inkjet recording apparatus according to the embodiment of the present disclosure.
Figure 3:
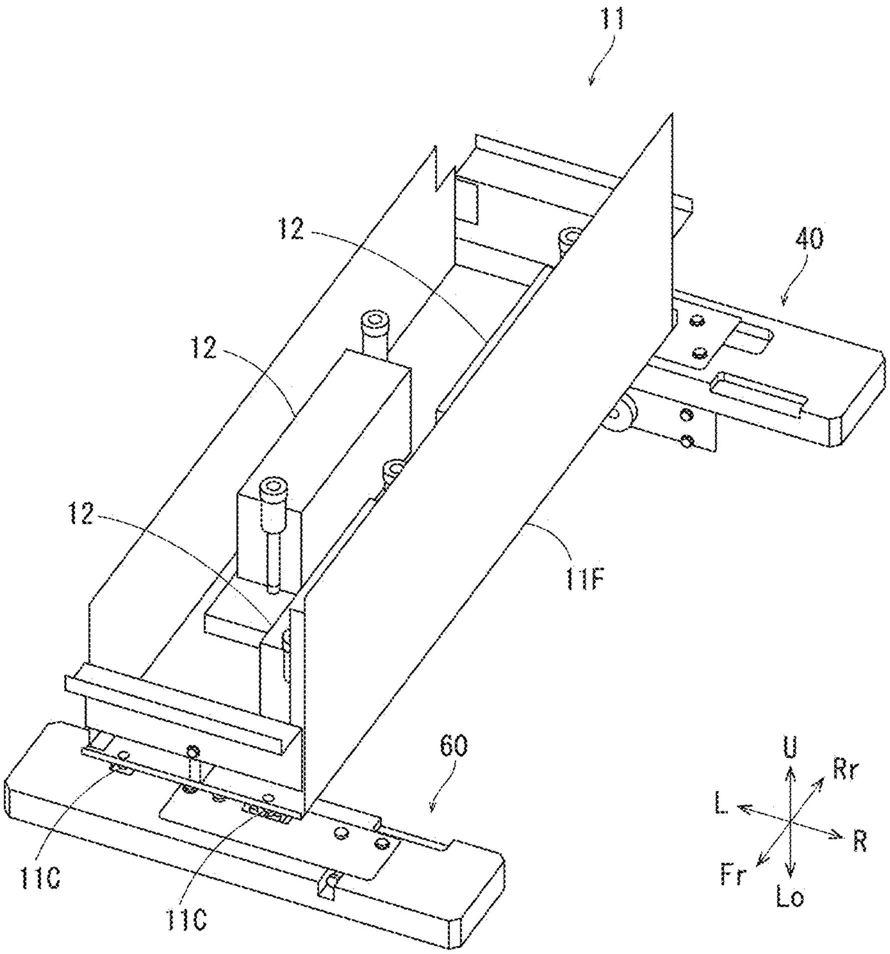
FIG. 3 is a perspective view showing a head unit according to the embodiment of the present disclosure.
Figure 4:
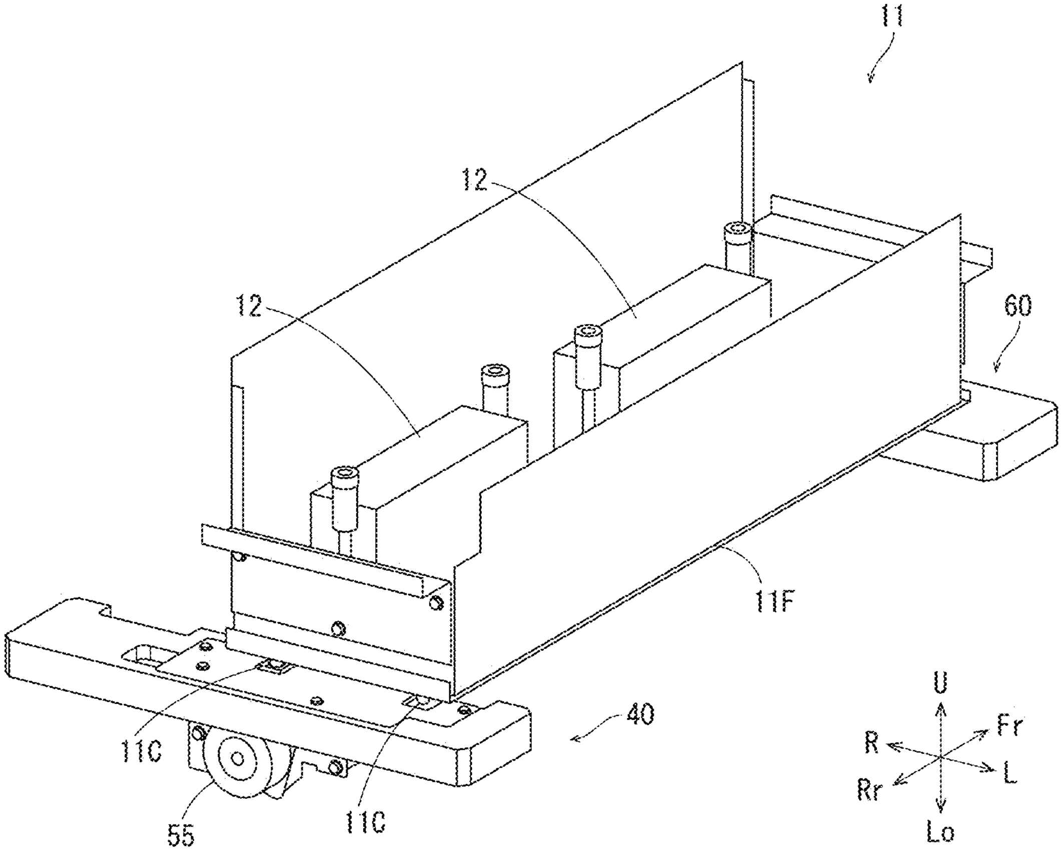
FIG. 4 is a perspective view showing the head unit according to the embodiment of the present disclosure.

FIG. 1 is a perspective view showing the appearance of the image forming system 100. FIG. 2 is a front view schematically showing the inner configuration of the inkjet recording apparatus 1. FIG. 3 and FIG. 4 are perspective views showing a head unit 11. Hereinafter, the front side of the paper plane on which FIG. 2 is drawn is referred to as the front side of the inkjet recording apparatus 1, and the left- and right-direction will be described with reference to the direction in which the inkjet recording apparatus 1 is viewed from the front side. In each figure, U, Lo, L, R, Fr, and Rr indicate the upper, lower, left, right, front, and rear, respectively.

The image forming system 100 (see FIG. 1) includes a sheet feeding apparatus 110, an inkjet recording apparatus 1, a drying apparatus 120, and a post-processing apparatus 130. The sheet feeding apparatus 110 stores several thousand of sheets S, and feeds the sheet S to the inkjet recording apparatus 1. The inkjet recording apparatus 1 forms an image on the sheet S by an inkjet method. The drying apparatus 120 heats and dries the ink ejected on the sheet S. The post-processing apparatus 130 performs post-processing such as drilling, stapling, and folding on the sheet S.

The inkjet recording apparatus 1 (see FIG. 2) includes a box-shaped body housing 3. In the center portion of the inside of the body housing 3, a conveying unit 7 which attracts the sheet S and conveys it in the Y direction is provided. Above the conveying unit 7, an image forming unit 6 which forms an image by ejecting ink is provided. On the right surface of the body housing 3, a sheet feeding port 8 through which the sheet S is received from the sheet feeding apparatus 110 is provided. On the left side surface of the body housing 3, a discharge port 9 through which the sheet S on which the image is formed is discharged to the drying apparatus 120 is provided.

Inside the body housing 3, a conveyance path 10 is provided from the sheet feeding port 8 to the discharge port 9 through a gap between the conveying unit 7 and the image forming unit 6. A registration roller 18 is provided on the upstream side of the conveying unit 7 in the conveyance direction Y.

The conveying unit 7 includes an endless conveying belt 21 and a suction part 24. The conveying belt 21 has a large number of air holes (not shown), and is wound around a driving roller 25 and a driven roller 22. The upper surface of the suction part 24 has a large number of air holes (not shown), and is in contact with the inner surface of the conveying belt 21. The suction part 24 sucks air through the air holes of the conveying belt 21 and the air holes of the suction part 24, so that the sheet S is attracted to the conveying belt 21. When the driving roller 25 is driven in the counterclockwise direction by a driving part (not shown) including a motor and a reduction gear, the conveying belt 21 travels in the counterclockwise direction, and the sheet S attracted to the conveying belt 21 is conveyed.

The image forming unit 6 includes a plurality (in this embodiment, four) of head units 11. The head unit 11 (see FIG. 3, FIG. 4) includes one or more inkjet heads 12 (in the present embodiment, three ink jet heads 12 arranged in a staggered pattern). Ink containers 20 filled with black, cyan, magenta, and yellow ink are connected to the head units 11. A maintenance device 30 which performs maintenance of the inkjet head 12 is provided on the right side of each head unit 11.

A control part 2 (see FIG. 2) includes an arithmetic part and a storage part (not shown). The arithmetic part is, for example, a CPU (Central Processing Unit). The storage part includes a storage medium such as ROM (Read Only Memory), RAM (Random Access Memory), EEPROM (Electrically Erasable Programmable Read Only Memory), and the like. The arithmetic part reads the control program stored in the storage part and executes various processes. The control part 2 may be implemented by an integrated circuit that does not use software.

A display operation part 19 is provided on the upper portion of the body housing 3 (see FIG. 2). The display operation part 19 includes a display panel, a touch panel laminated on the display panel, and a keypad (not shown). The control part 2 displays a screen representing an operation menu, a status, or the like of the inkjet recording apparatus 1 on the display panel, and controls each part of the inkjet recording apparatus 1 in accordance with the operation detected by the touch panel and the keypad.

The basic image forming operation of the inkjet recording apparatus 1 is as follows. When an image forming job is inputted to the inkjet recording apparatus 1 from the display operation part 19 or an external computer, the sheet feeding apparatus 110 feeds the sheet S to the conveyance path 10 through the sheet feeding port 8, and the registration roller 18 whose rotation is stopped corrects the skew of the sheet S. When the registration roller 18 sends the sheet S to the conveying unit 7 at a predetermined timing, the conveying unit 7 attracts the sheet S to the conveying belt 21, and conveys the sheet S in the Y direction. The ink is ejected from the nozzle to form an image on the sheet S. The sheet S on which the image is formed is discharged to the drying apparatus 120 through the discharge port 9.

Figure 5:
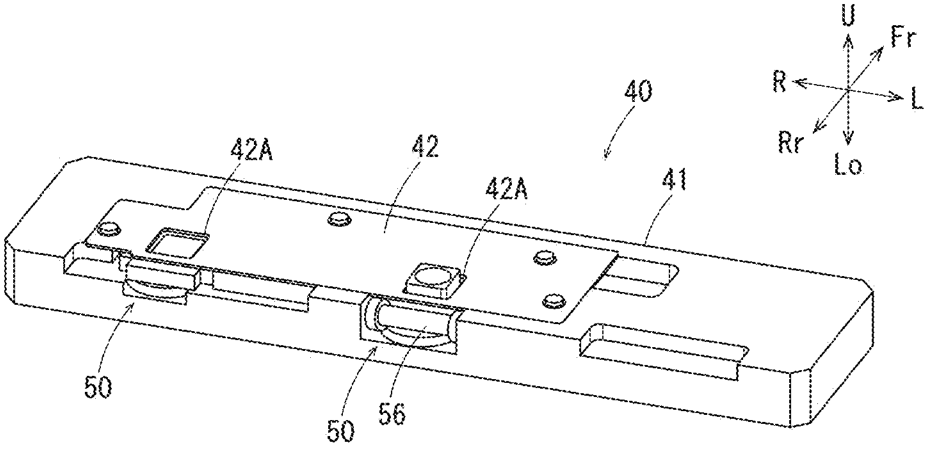
FIG. 5 is a perspective view showing an adjustment device according to the embodiment of the present disclosure.
Figure 6:
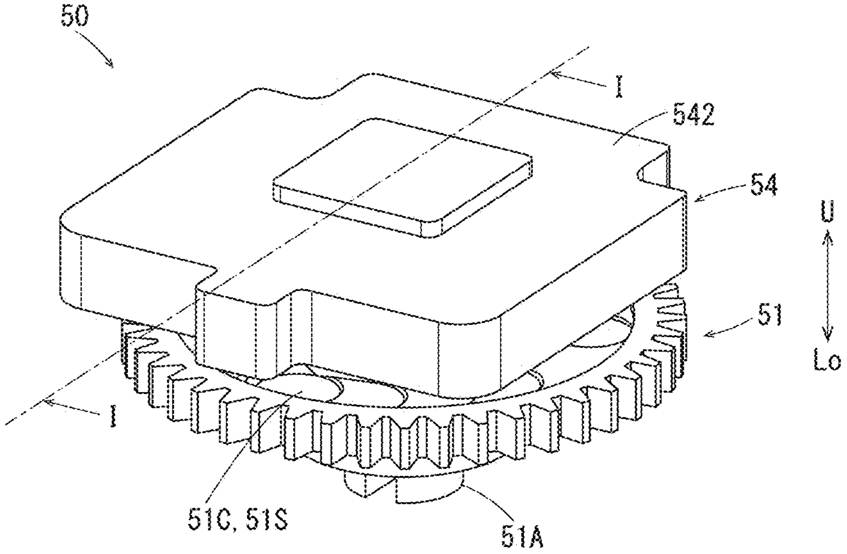
FIG. 6 is a perspective view showing a gap adjustment device according to the embodiment of the present disclosure.
Figure 7:
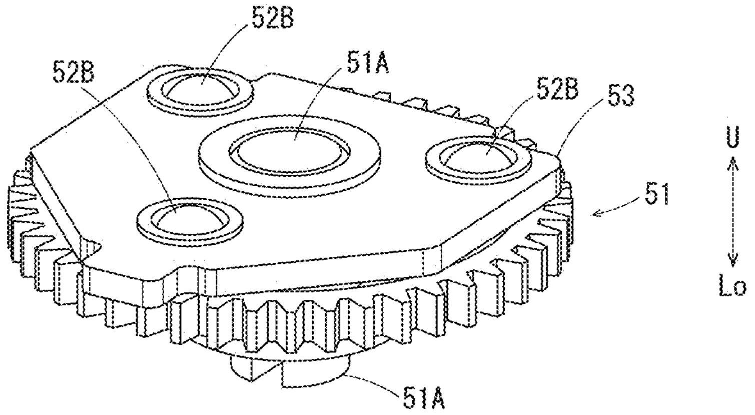
FIG. 7 is a perspective view showing a rotating member, spherical bodies and a retainer according to the embodiment of the present disclosure.
Figure 8:
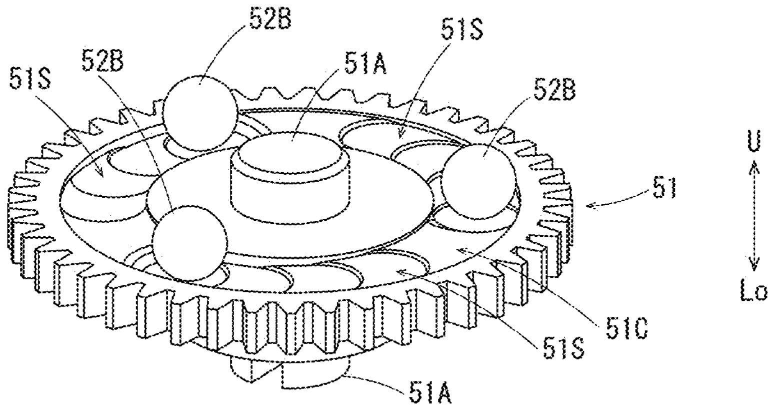
FIG. 8 is a perspective view showing the rotating member and the spherical bodies according to the embodiment of the present disclosure.
Figure 9:
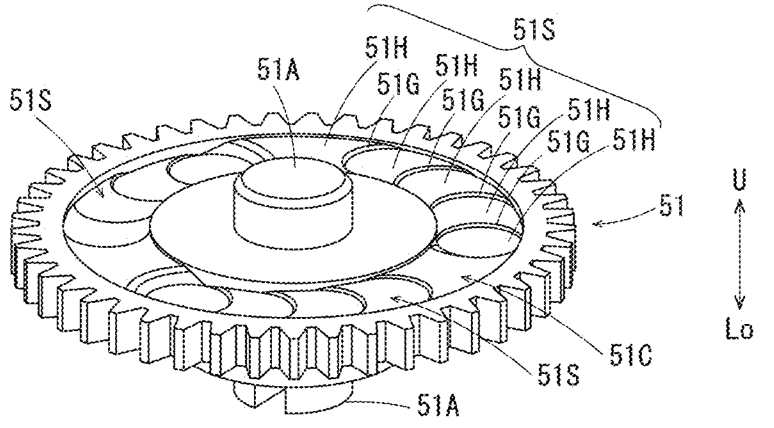
FIG. 9 is a perspective view showing the rotating member according to the embodiment of the present disclosure.
Figure 10:
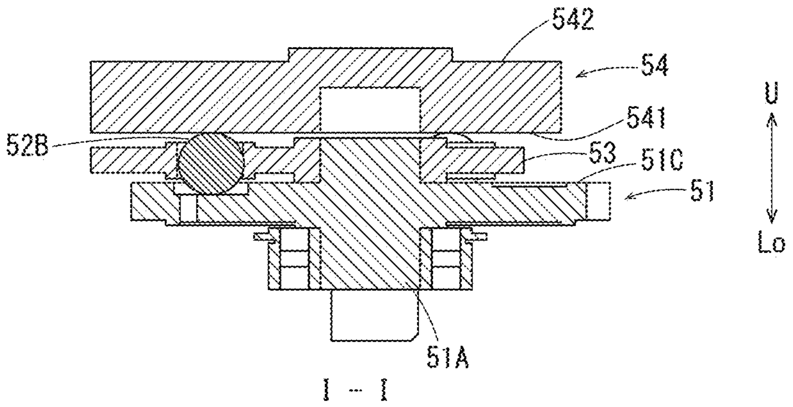
FIG. 10 is a cross-sectional view taken along the line I-I in FIG. 6.
Figure 11:
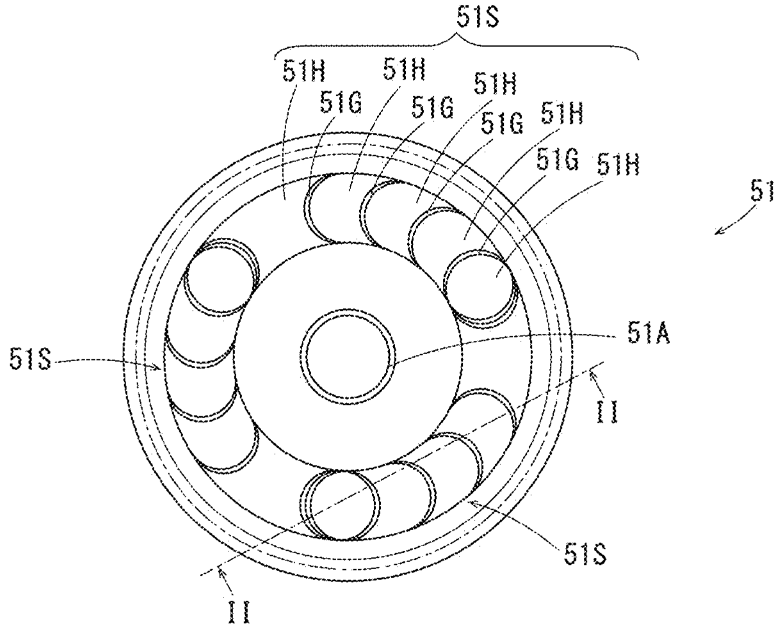
FIG. 11 is a plan view showing the rotating member according to the embodiment of the present disclosure.
Figure 12:
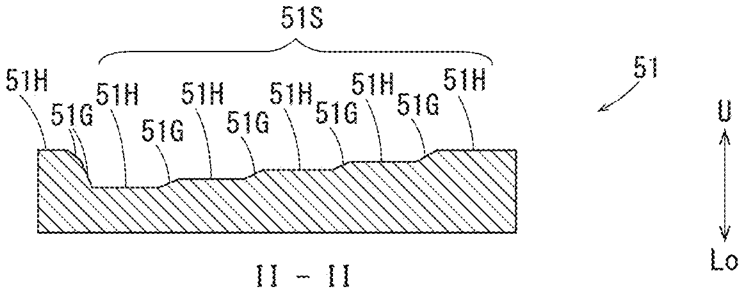
FIG. 12 is a cross-sectional view taken along the line II-II in FIG. 11.
Figure 13:
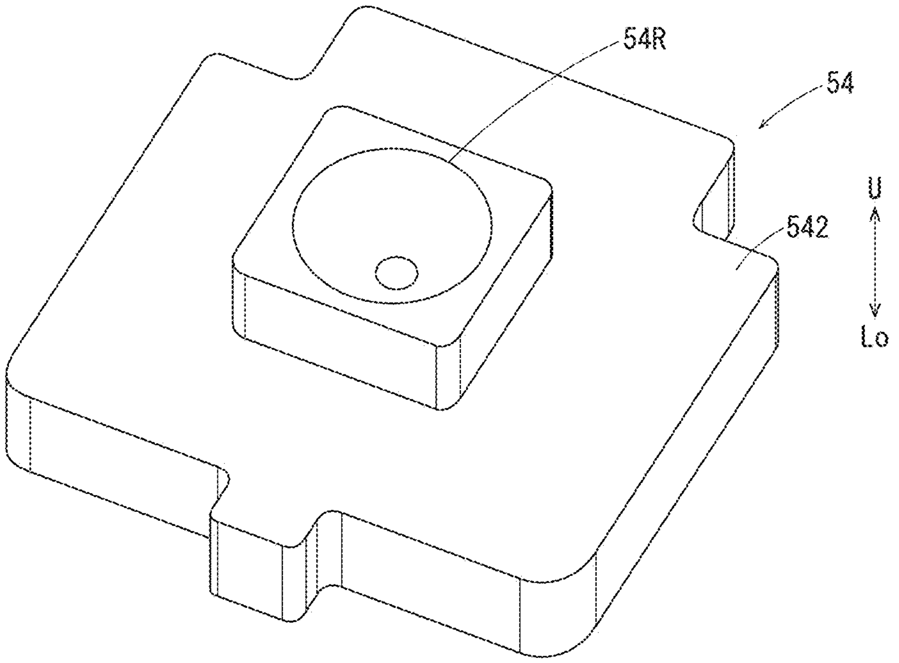
FIG. 13 is a perspective view showing a regulation part according to the embodiment of the present disclosure.
Figure 14:
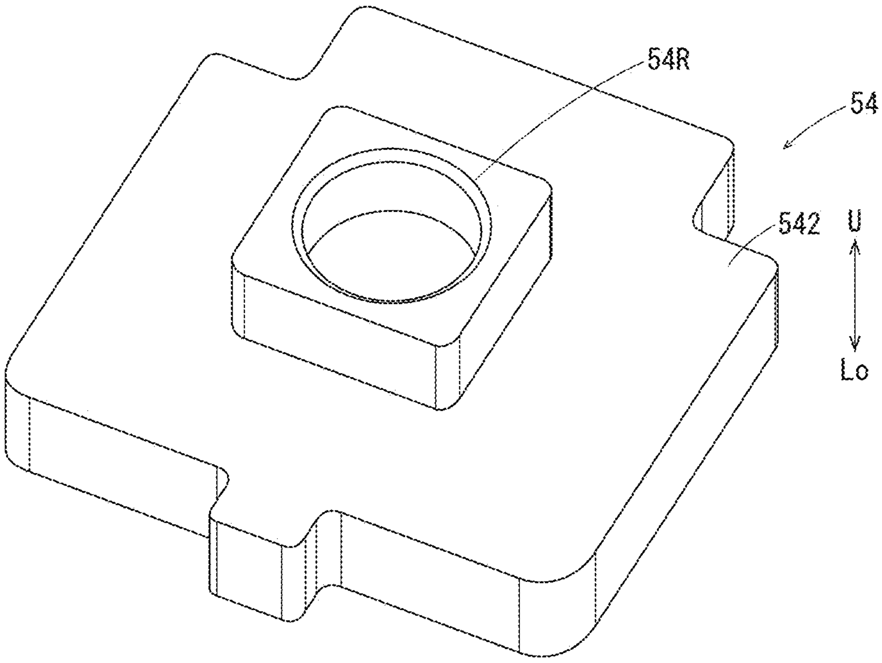
FIG. 14 is a perspective view showing the regulation part according to the embodiment of the present disclosure.

Next, a characteristic structure of the present embodiment will be described. FIG. 5 is a perspective view showing an adjustment device 40. FIG. 6 is a perspective view showing a gap adjustment device 50. FIG. 7 is a perspective view showing a rotating member 51, spherical bodies 52B, and a retainer 53. FIG. 8 is a perspective view showing the rotating member 51 and the spherical bodies 52B. FIG. 9 is a perspective view showing the rotating member 51. FIG. 10 is a cross-sectional view taken along the line I-I of FIG. 6. FIG. 11 is a plan view showing the rotating member 51. FIG. 12 is a cross-sectional view taken along the line II-II of FIG. 11. FIG. 13 and FIG. 14 are perspective views showing a regulation part 54R.

The inkjet recording apparatus 1 according to the present embodiment includes the head unit 11 having one or more of the inkjet heads 12 and a gap adjustment device 50 which adjusts a gap of the head unit 11 with respect to the conveyance path 10 along which the sheet S is conveyed. The gap adjustment device 50 includes a shaft 51A, a rotating member 51 having an intersection surface 51C intersecting the shaft 51A and rotatable around the shaft 51A, a stepped part 51S provided on the intersection surface 51C and whose height is changed in a stepped pattern in the circumferential direction, a gap adjustment member 54 having one surface (the front side surface) 541 and the other surface (the rear side surface) 542 forming the front and rear side surfaces, one surface 541 facing the intersection surface 51C while the other surface 542 being in contact with the head unit 11, and movable in the direction of the shaft 51A, and spherical bodies 52B held between the one surface 541 and the intersection surface 51C. Specifically, they are as follows.

[Adjustment Device] The head unit 11 (see FIG. 3 and FIG. 4) includes the three inkjet heads 12 arranged in a staggered pattern and a frame body 11F which supports the three inkjet heads 12. At both the front and rear end portions of the bottom portion of the frame body 11F, left and right contact portions 11C are provided. The contact portion 11C is, for example, a pin projecting downward. An adjustment device 40 is provided below the rear end portion of the frame body 11F. The adjustment device 60 is provided below the front end portion of the frame body 11F. The adjustment devices 40 and 60 support the head unit 11 through the contact portions 11C.

[Gap Adjustment Device] The adjustment device 40 (see FIG. 5) has a box-shaped housing 41 whose longitudinal direction is along the left-and-right direction. The gap adjustment device 50 (see FIG. 6) is housed inside the housing 41. The gap adjustment device 50 is provided at two places spaced apart in the left-and-right direction. The upper portions of the gap adjustment devices 50 are covered with a lid 42.

The gap adjustment device 50 (see FIG. 6 to FIG. 12) includes the shaft 51A, the rotating member 51, the gap adjustment member 54, the spherical bodies 52B, and the retainer 53. The shaft 51A is supported by the housing 41 with the upper-and-lower direction as the axial direction. The rotating member 51 is, for example, a spur gear.

The upper surface (see FIG. 9, FIG. 11 and FIG. 12) of the rotating member 51 is an example of the intersection surface 51C intersecting the shaft 51A. On the intersection surface 51C, a stepped part 51S whose height is changed in a stepped pattern in the circumferential direction. The stepped parts 51S having the same pattern are provided in the circumferential direction on the intersection surface 51C. In this embodiment, the three stepped parts 51S having the same pattern are provided at intervals in the circumferential direction on the intersection surface 51C.

The stepped part 51S includes five steps 51H arranged in the circumferential direction and four slopes 51G connecting the adjacent steps 51H. The five steps 51H are provided so as to increase in height in the counterclockwise direction. The three stepped parts 51S are at intervals the provided equal in circumferential direction. In other words, the intersection surface 51C is configured such that the step-like height changes having the same pattern are repeated in 120 degrees cycles.

The gap adjustment member 54 (see FIG. 6) is formed as a rectangular parallelepiped block as a whole. The gap adjustment member 54 is provided above the rotating member 51. One surface 541 (for example, the lower surface) of the gap adjustment member 54 faces the intersection surface 51C of the rotating member 51, and the other surface 542 (for example, the upper surface) of the gap adjustment member 54 faces the bottom portion of the frame body 11F. The gap adjustment member 54 is supported by the housing 41 and the shaft 51A, and is slidable in the direction of the shaft 51A.

The spherical bodies 52B (see FIG. 7 and FIG. 8) are provided between one surface 541 of the gap adjustment member 54 and the intersection surface 51C. One spherical body 52B is arranged in each of the steppe parts 51S, and the spherical bodies 52B are in contact with the steps 51H having the same height in the stepped parts 51S. The spherical bodies 52B are held by the retainer 53. The retainer 53 regulates the relative movement of the spherical bodies 52B relative to the retainer 53. The retainer 53 is formed in a circular plate, and parts of the spherical body 52B protrude from the upper surface and the lower surface of the retainer 53. The retainer 53 is supported by the housing 41 and the shaft 51A, and is slidable in the direction of the shaft 51A, but rotation around the shaft 51A is restricted. Since the height of the step 51H in contact with the spherical body 52B changes with the rotation of the rotating member 51, the gap adjustment member 54 moves in the direction of the shaft 51A together with the spherical bodies 52B and the retainer 53.

The lid 42 is provided with two openings 42A corresponding to the gap adjustment members 54. Through the opening 42A, a part of the other surface 542 (the upper surface) of the gap adjustment member 54 is exposed. Of the two gap adjustment devices 50, the gap adjustment member 54 of the left gap adjustment device 50 is provided with a regulation part 54R The regulation part 54R is provided on the other surface 542 of the gap adjustment member 54 and protrudes through the opening 42A of the lid 42. The regulation part 54R has a funicular (see FIG. 13) or cylindrical (see FIG. 14) concave shape. Since the contact portion 11C of the head unit 11 is accommodated in the regulation part 54R, movement of the contact portion 11C in the direction intersecting the shaft 51A is regulated.

On the rear side of the gap adjustment member 54 of the left gap adjustment device 50, a roller 56 whose axial direction is along the left-and-right direction is provided. The roller 56 is in contact with the rear surface of the gap adjustment member 54 to prevent the gap adjustment member 54 from deviating rearward and to reduce frictional resistance in the movement of the gap adjustment member 54 in the direction of the shaft 51A.

A drive part 55 (see FIG. 4) includes a motor, a worm gear, a gear train, and the others (not shown), and drives the rotating member 51. The control part 2 stores conversion information relating the thickness of the sheet S to the rotation angle of the rotating member 51. The control part 2 obtains the rotation angle corresponding to the thickness of the sheet S fed to the conveyance path 10 from the conversion information, and controls the drive part 5 to drive the rotating member 51. Since the height of the step 51H in contact with the spherical body 52B changes with the rotation of the rotating member 51, the gap adjustment member 54 moves in the direction of the shaft 51A together the spherical bodies 52 and the retainer 53. With the movement of the gap adjustment member 54, the head unit 11 moves in the direction of the shaft 51A. Thus, the gap of the head unit 11 with respect to the conveyance path 10 is adjusted according to the thickness of the sheet S.

Figure 15:
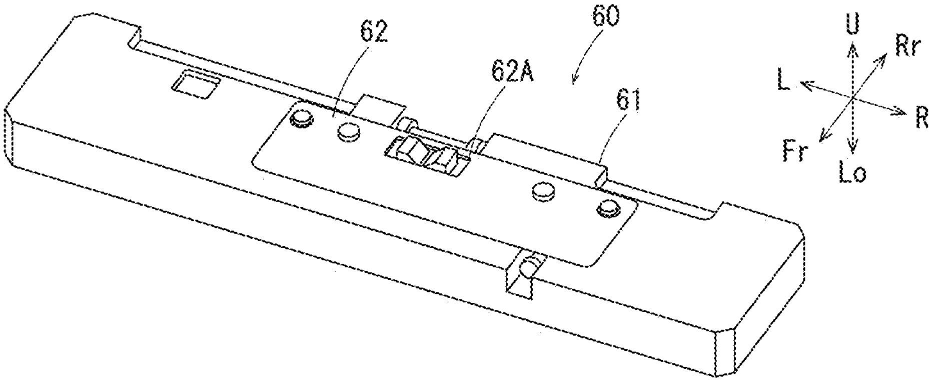
FIG. 15 is a perspective view showing the adjustment device according to the embodiment of the present disclosure.
Figure 16:
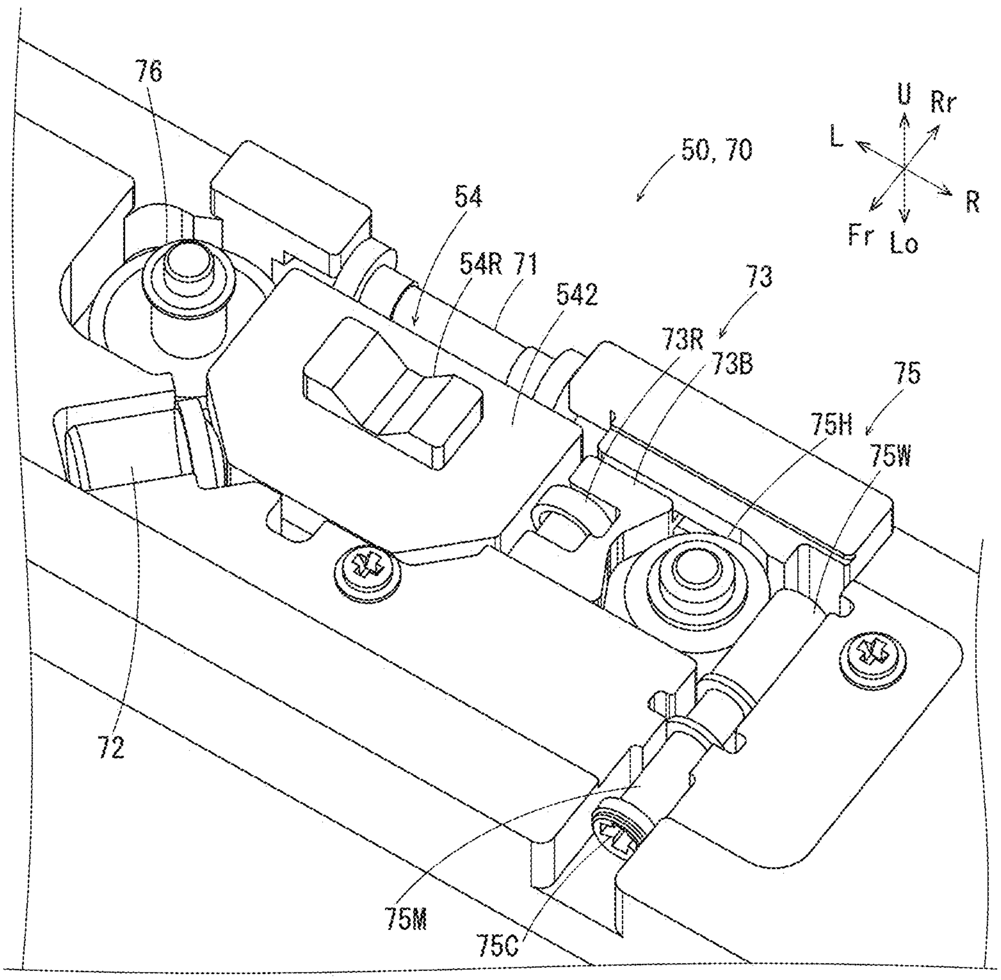
FIG. 16 is a perspective view showing an alignment adjustment device according to the embodiment of the present disclosure.
Figure 17:
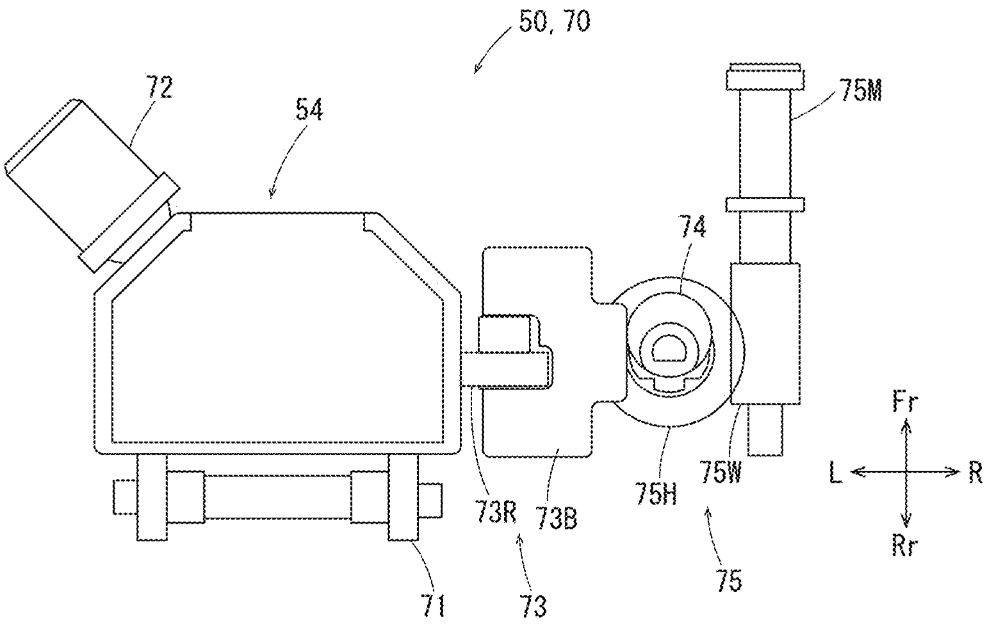
FIG. 17 is a bottom view showing the alignment adjustment device according to the embodiment of the present disclosure.
Figure 18:
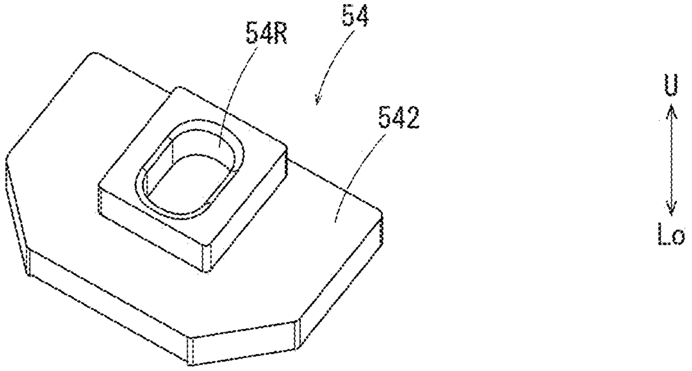
FIG. 18 is a perspective view showing the regulation part according to the embodiment of the present disclosure.

[Alignment Adjustment Device] FIG. 15 is a perspective view showing the adjustment device 60. FIG. 16 is a perspective view showing the alignment adjustment device 70. FIG. 17 is a bottom view showing the alignment adjustment device 70. FIG. 18 is a perspective view showing the regulation part 54R.

The adjustment device 60 (see FIGS. 15 to 17) has a box-shaped housing 61 whose longitudinal direction is along the left-and-right direction. The gap adjustment device 50 is housed inside the housing 61. The upper portion of the gap adjustment device 50 is covered with a lid 62. The adjustment device 60 includes, in addition to the gap adjustment device 50, an alignment adjustment device 70 which adjusts the orientation of the head unit 11 with respect to the conveyance direction Y of the sheet S.

The gap adjustment device 50 has the same basic configuration as the gap adjustment device 50 provided in the adjustment device 40, but the configuration of the gap adjustment member 54 is different. The gap adjustment member 54 is movable in the direction of the shaft 51A and in the left-and-right direction. The gap adjustment member 54 has a shape in which the left front and right front corners of the rectangle are cut off when viewed in the upper-and-lower direction. A roller 71 whose axial direction is along the left-and-right direction is provided behind the gap adjustment member 54. The roller 71 is in contact with the rear surface of the gap adjustment member 54 to prevent the gap adjustment member 54 from deviating rearward and to reduce frictional resistance in the movement of the gap adjustment member 54 in the direction of the shaft 51A.

The alignment adjustment device 70 includes a biasing part 72, a pressing part 73, an eccentric cam 74, a worm gear 75, and a driving part 76. The biasing part 72 is provided on the left front side of the gap adjustment member 54, and biases the gap adjustment member 54 to the right rear side. The biasing part 72 is, for example, a plunger.

The pressing part 73 is provided on the right side of the gap adjustment member 54, and presses the gap adjustment member 54 leftward. The pressing part 73 includes a block 73B and a roller 73R. The block 73B is supported by the housing 61, and is slidable in the left-and-right direction. The roller 73R is supported by the block 73B with the front-and-rear direction as the axial direction. The outer circumferential surface of the roller 73R is exposed to the left side of the block 73B and is in contact with the right side surface of the gap adjustment member 54.

The worm wheel 75H is supported by the housing 61 with the upper-and-lower direction as the axial direction. The worm 75W is supported by the housing 61 with the front-and-rear direction as the axial direction. The eccentric cam 74 is provided below the worm wheel 75H coaxially with the worm wheel 75H, and is in contact with the right side surface of the block 73B. A worm operation part 75M is provided on the front side of the worm 75W coaxially with the worm 75W. A cross hole 75C into which a tip of a Phillips screwdriver is inserted is provided at the front end portion of the worm operation part 75M. The driving part 76 which drives the rotating member 51 of the gap adjustment device 50 is provided on the left side of the gap adjustment member 54.

The lid 62 is provided with an opening 62A corresponding to the gap adjustment member 54. The gap adjustment member 54 is provided with the regulation part 54R. The regulation part 54R is provided on the other surface 542 (the upper surface) of the gap adjustment member 54, and protrudes through the opening 62A of the lid 62. The regulation part 54R has a V-shaped groove shape (see FIG. 16) whose longitudinal direction is along the front-and-rear direction or a long hole shape (see FIG. 18) whose longitudinal direction is along the front-and-rear direction. Since the contact portion 11C of the head unit 11 is accommodated in the regulation part 54R, the relative movement of the contact portion 11C in the left-and-right direction with respect to the regulation part 54R is regulated. On the other hand, the relative movement of the contact portion 11C with respect to the regulation part 54R in the front-and-rear direction is not regulated.

The biasing part 72 biases the gap adjustment member 54 in the right and rear direction, and the pressing part 73 presses the gap adjustment member 54 leftward against the biasing part 72, so that the gap adjustment member 54 is positioned in the left-and-right direction. When the worm 75W is rotated by the operation of the worm operation part 75M, the worm wheel 75H is rotated, and the eccentric cam 74 is rotated together with the worm wheel 75H. With the rotation of the eccentric cam 74, the gap adjustment member 54 slides in the left- and right-direction together with the block 73B. On the other hand, as described above, in the rear end portion of the head unit 11, the movement of one of the two contact portions 11C in the direction crossing the shaft 51A is restricted. Therefore, when the gap adjustment member 54 is moved in the left-and-right direction, the head unit 11 performs a circular movement around the contact portion 11C whose movement in the direction intersecting the shaft 51A is regulated. Since the regulation part 54R does not regulate the movement of the contact portion 11C in the front-and-rear direction, the positioning can be performed smoothly without generating resistance to the contact portion 11C.

According to the inkjet recording apparatus 1 according to the present embodiment described above, the inkjet recording apparatus 1 includes the head unit 11 having one or more of the inkjet heads 12, and the gap adjustment device 50 which adjusts a gap of the head unit 11 with respect to the conveyance path 10 along which the sheet S is conveyed. Thee gap adjustment device 50 includes the shaft 51A, the rotating member 51, the stepped part 51S, the gap adjustment member 54, and the spherical bodies 52B. The rotating member 51 has the intersection surface 51C intersecting the shaft 51A, and is rotatable around the shaft 51A. The stepped part 51S is provided on the intersection surface 51C, and the height is changed in a stepped pattern in the circumferential direction. The gap adjustment member 54 has one surface 541 and the other surface 542 forming the front side surface and the rear side surface, the one surface 541 facing the intersection surface 51C while the other surface 542 being in contact with the head unit 11, and is movable in the direction of the shaft 51A. The spherical bodies 52B are held between one surface 541 and the intersection surface 51C. According to this configuration, since the gap adjustment can be performed by rotating the rotating member 51, the space-saving performance is excellent compared with the configuration in which the member having a step formed linearly is slid. Further, since the gap can be increased or decreased by rotating the rotating member 51 in one direction, an impact due to backlash is not generated. Therefore, according to the present embodiment, the gap adjustment of the head unit 11 can be performed without reducing the space-saving performance and durability. Further, in the case where the spherical bodies 52B are held between one surface 541 and the intersection surface 51C, the resistance when getting over the steps of the intersection surface 51C can be reduced.

Further, according to the inkjet recording apparatus 1 according to the present embodiment, the stepped parts 51S having the same pattern are provided at intervals in the circumferential direction on the intersection surface 51C, one spherical body 52B or one protrusion 52P is arranged in each of the stepped parts 51S, and the spherical bodies 52B or the protrusions 52P are in contact with the steps 51H having the same height in the stepped parts 51S. According to this configuration, since the loads applied to the rotating member 51 and the gap adjustment member 54 are distributed in a plurality of places, the stress concentration can be suppressed. Further, since the load is distributed around the shaft 51A, the distortion of the rotating member 51 due to the deviation of the load and the error of gap adjustment can be suppressed.

According to the inkjet recording apparatus 1 according to the present embodiment, the three stepped parts 51S having the same pattern are provided at intervals in the circumferential direction on the intersection surface 51C, and one spherical body 52B or one protrusion 52P is arranged in each of the three stepped parts 51S. According to this configuration, the posture of the gap adjustment member 54 can be stabilized.

According to the inkjet recording apparatus 1 according to the present embodiment, the gap adjustment device 50 is provided in at least two locations on one end side in the longitudinal direction of the head unit 11 and in at least one location on the other end side. According to this configuration, the posture of the head unit 11 can be stabilized.

According to the inkjet recording apparatus 1 according to the present embodiment, the head unit 11 is provided with the contact portions 11C in contact with the gap adjustment members 54 respectively. Any one of the gap adjustment members 54 is provided with the regulation part 54R which regulates the movement of the contact portion 11C in the direction intersecting the shaft 51A. Any one of the gap adjustment devices 50 provided in the end portion on the side where the regulation part 54R is not provided, among the end portions in the longitudinal direction of the head unit 11 is provided with the alignment adjustment device 70 which moves the contact portion 11C in a predetermined direction intersecting the longitudinal direction. According to this configuration, since the alignment adjustment can be performed using the gap adjustment device 50, the number of components can be decreased compared with the case where the structure for the alignment adjustment is provided separately from the gap adjustment device 50.

In addition, according to the inkjet recording apparatus 1 according to the present embodiment, the alignment adjustment device 70 includes the biasing part 72 which biases the gap adjustment member 54, and the pressing part 73 which presses the gap adjustment member 54 against the biasing part 72. According to this configuration, the alignment adjustment can be performed by simple configuration.

According to the inkjet recording apparatus 1 according to the present embodiment, the gap adjustment device 50 includes the drive part 55 which rotates the rotating member 51 according to the thickness of the sheet S. According to this configuration, the gap adjustment can be performed quickly.

According to the inkjet recording apparatus 1 according to the present embodiment, the stepped part 51S includes the slopes 51G connecting the adjacent steps 51H. According to this configuration, the spherical body 52 can smoothly get over the step.

The above embodiment may be modified as follows.

The above embodiment shown an example in which the rotating member 51 is a spur gear, but the rotating member 51 may be configured to be driven to be rotated around the shaft 51A, and the rotating member 51 itself may not be a gear. For example, it may be composed of a plate-like member and a gear joined to the lower surface of the plate-like member (not shown).

In place of the spherical body 52B of the above embodiment, the protrusion 52P (not shown) protruding from one surface 541 of the gap adjustment member 54 and in contact with the intersection surface 51C may be provided. In this case, the retainer 53 is unnecessary. One protrusion 52P is arranged in each of the steppe parts 51S, and the protrusions 52P are in contact with the steps 51H having the same height in the stepped part 51S. This configuration also changes the height of the step 51H in contact with the protrusion 52P with the rotation of the rotating member 51, so that the gap adjustment member 54 moves in the direction of the shaft 51A.

The above embodiment shows an example in which the biasing part 72 is a plunger, but the biasing part 72 may be a compression coil spring. The above embodiment shown an example in which the pressing part 73 is driven by the eccentric cam 74 and the worm gear 75, but the pressing part 73 may be driven using a feed screw.

The invention claimed is:

1. An inkjet recording apparatus comprising:

a head unit including one or more inkjet heads; and a gap adjustment device which adjusts a gap of the head unit with respect to a conveyance path along which a sheet is conveyed, wherein the gap adjustment device includes:

a shaft;

a rotating member having an intersection surface intersecting the shaft and rotatable around the shaft;

a stepped part provided on the intersection surface and whose height is changed in a stepped pattern in a circumferential direction;

a gap adjustment member having a rear side surface facing the intersection surface and a front side surface being in contact with the head unit, and movable in a direction of the shaft; and a spherical body held between the rear side surface and the intersection surface or a protrusion protruding from the rear side surface and in contact with the intersection surface.

2. The inkjet recording apparatus according to claim 1, wherein the stepped part is provided at a plurality of places in the circumferential direction on the intersection surface, the stepped parts have the same pattern, the spherical body or the protrusion is arranged on each of the stepped parts, and the spherical bodies or the protrusions are in contact with steps having the same height in the stepped parts.

3. The inkjet recording apparatus according to claim 2, wherein the stepped part is provided at three places in the circumferential direction on the intersection surface, the three stepped parts have the same pattern, and the spherical body or the protrusion is arranged on each of the stepped parts.

4. The inkjet recording apparatus according to claim 1, wherein the gap adjustment device is provided in at least two positions in one longitudinal end portion of the head unit and in at least one position in the other longitudinal end portion of the head unit.

5. The inkjet recording apparatus according to claim 1, wherein the head unit has a plurality of contact portions in contact with the gap adjustment members, one of the gap adjustment members includes a regulation part which regulates a movement of the contact portion in a direction intersecting the shaft, one of the gap adjustment members provided in the end portion where the regulation part is not provided, of the both longitudinal end portions of the head unit includes an alignment adjustment device which moves the contact portion in a direction intersecting the longitudinal direction.

6. The inkjet recording apparatus according to claim 5, wherein the alignment adjustment device includes:

a biasing part which biases the gap adjustment member; and a pressing part which presses the gap alignment member against a biasing force of the biasing part.

7. The inkjet recording apparatus according to claim 1, comprising:

a drive part which rotates the rotating member in accordance with a thickness of the sheet.

8. The inkjet recording apparatus according to claim 1, wherein the stepped part has a slope connecting the adjacent steps.

9. The inkjet recording apparatus according to claim 1, wherein the stepped part has a height lower than the intersection surface.

* * * * *